(12) United States Patent
Dudar et al.

(10) Patent No.: US 10,049,512 B2
(45) Date of Patent: Aug. 14, 2018

(54) VEHICLE PUDDLE LIGHTS FOR ONBOARD DIAGNOSTICS PROJECTION

(71) Applicant: Ford Global Technologies, LLC, Dearborn, MI (US)

(72) Inventors: Aed M. Dudar, Canton, MI (US); Dennis Seung-Man Yang, Canton, MI (US); Russell Randall Pearce, Ann Arbor, MI (US); Mahmoud Yousef Ghannam, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 15/186,855

(22) Filed: Jun. 20, 2016

(65) Prior Publication Data

US 2017/0365111 A1    Dec. 21, 2017

(51) Int. Cl.
*G07C 5/08* (2006.01)
*B60R 1/00* (2006.01)
*B60R 1/12* (2006.01)
*B60Q 1/24* (2006.01)

(52) U.S. Cl.
CPC .............. *G07C 5/0825* (2013.01); *B60Q 1/24* (2013.01); *B60R 1/12* (2013.01); *G07C 5/0808* (2013.01); *B60Q 2400/50* (2013.01); *G07C 2205/02* (2013.01)

(58) Field of Classification Search
None
See application file for complete search history.

(56) References Cited

U.S. PATENT DOCUMENTS

| | | | |
|---|---|---|---|
| 6,871,121 B2 | 3/2005 | Tomson | |
| 7,175,321 B1 * | 2/2007 | Lopez | B60Q 1/50 296/21 |
| 7,469,172 B2 | 12/2008 | Shah | |
| 8,509,986 B1 * | 8/2013 | Chen | G06F 3/017 345/168 |
| 9,178,371 B2 | 11/2015 | Koelsch | |
| 2006/0012884 A1 * | 1/2006 | Snorteland | B60R 11/02 359/630 |
| 2014/0107886 A1 | 4/2014 | Miljkovic et al. | |

FOREIGN PATENT DOCUMENTS

CN    102700480 A    10/2012

* cited by examiner

*Primary Examiner* — John Olszewski
*Assistant Examiner* — Gerrad A Foster
(74) *Attorney, Agent, or Firm* — Jason Rogers; Price Heneveld LLP

(57) ABSTRACT

A diagnostic system of a vehicle is provided herein. The system includes a control unit onboard the vehicle for controlling at least one of a vehicle system and a vehicle subsystem. A device prompts the control unit to diagnose an operating condition of the vehicle and report diagnostic data to the device. A light source onboard the vehicle is operable to project a diagnostic image onto a viewing surface located external to the vehicle.

18 Claims, 4 Drawing Sheets

VEHICLE PUDDLE LIGHTS FOR ONBOARD DIAGNOSTICS PROJECTION

FIELD OF THE INVENTION

The present invention generally relates to diagnostic systems, and more particularly, to diagnostic systems of vehicles.

BACKGROUND OF THE INVENTION

When diagnosing an operating condition of a vehicle, an automotive technician or other individual typically uses a scan tool to obtain diagnostic data that is displayed thereon. By consulting the diagnostic data displayed on the scan tool, the individual is able to service the vehicle.

SUMMARY OF THE INVENTION

According to one aspect of the present invention, a diagnostic system of a vehicle is provided. The system includes a control unit onboard the vehicle that controls at least one of a vehicle system and a vehicle subsystem and is configured for self-diagnosis. A device prompts the control unit to report diagnostic data. A light source onboard the vehicle is operable to project a diagnostic image onto a viewing surface.

According to another aspect of the present invention, a diagnostic system of a vehicle is provided. The system includes a control unit onboard the vehicle for controlling at least one of a vehicle system and a vehicle subsystem. A device prompts the control unit to diagnose an operating condition of the vehicle and report diagnostic data to the device. A light source onboard the vehicle is operable to project a diagnostic image onto a viewing surface located external to the vehicle.

According to yet another aspect of the present invention, a method of diagnosing an operational condition of a vehicle is provided. A scan tool is used to prompt a control unit onboard the vehicle to diagnose the operating condition of the vehicle and report diagnostic data to the scan tool. A light source onboard the vehicle is operated to project a diagnostic image onto a viewing surface.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
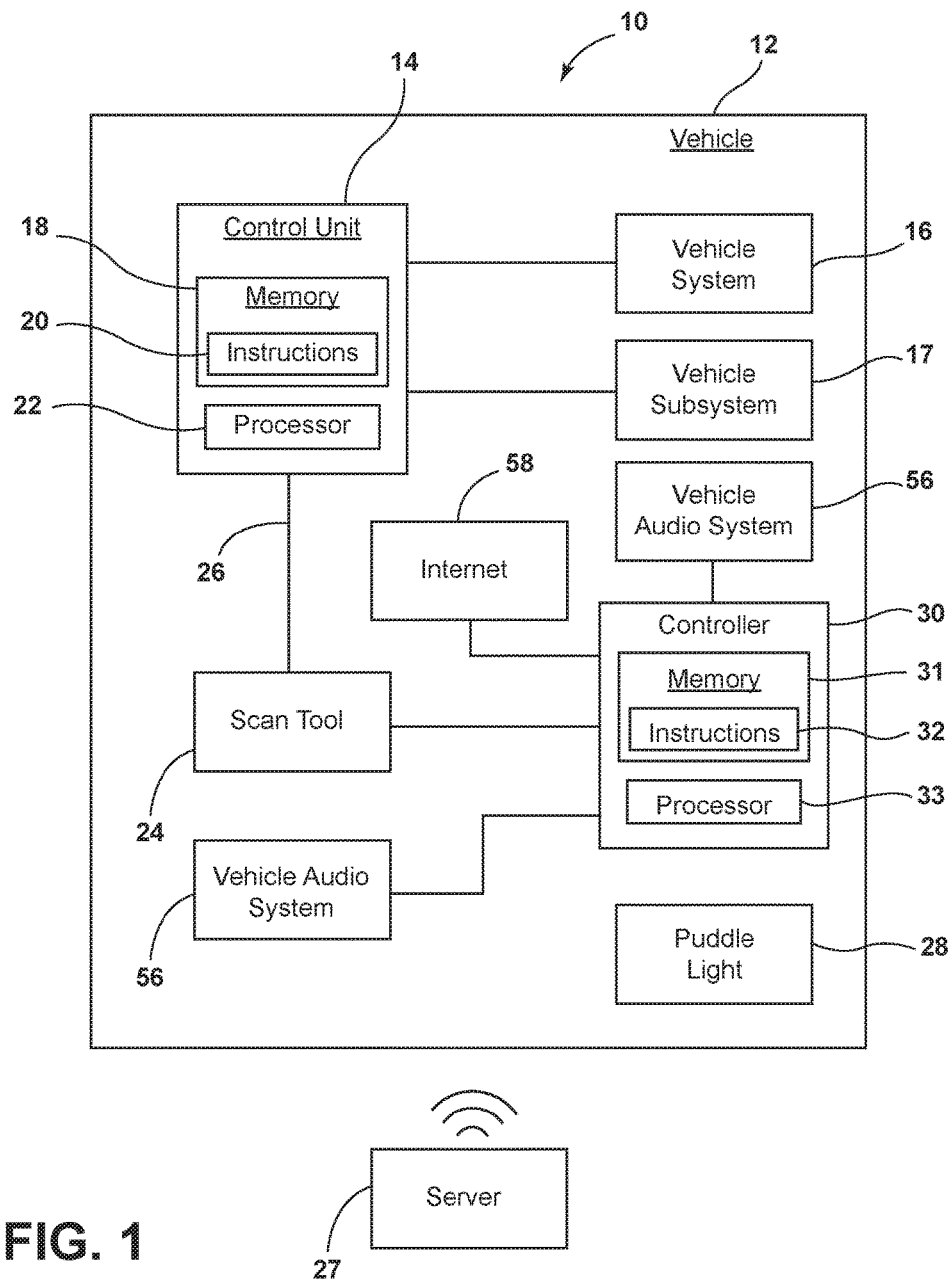
FIG. 1 is a block diagram of a diagnosing system of a vehicle.

Referring to FIG. 1, a diagnostic system 10 of a vehicle 12 is shown according to one embodiment. The system 10 includes one or more control units provided onboard the vehicle 12. For purposes of simplicity, a single control unit 14 is shown and described herein. As described herein, a control unit generally relates to any embedded system that controls one or more of the systems and/or subsystems of the vehicle 12. Examples of control units include, but are not limited to, an engine control unit, a door control unit, an electric power steering control unit, a powertrain control module, a seat control unit, a telematics control unit, a speed control unit, a transmission control unit, a brake control module, etc. In operation, the control unit 14 controls the operation of a vehicle system 16 and/or vehicle subsystem 17 and is capable of self-diagnosis. For example, the control unit 14 may obtain diagnosis data that is related to malfunctions or other operating conditions of the vehicle system 16 and/or vehicle subsystem 17. The diagnosis data may include diagnostic trouble codes (DTCs) as is required in some countries such as the United States and may be stored to a memory 18 of the control unit 14. The memory 18 may additionally store one or more instructions 20 executable by a processor 22 and pertaining to the operation of the vehicle system 16, the operation of the vehicle subsystem 17, the execution of a self-diagnostic or any combination thereof. Accordingly, it is to be understood that the system 10 provided herein may be configured as an onboard diagnostic (OBD) system to be compliant with the laws and regulations of a particular country or region.

To retrieve the data, a scan tool 24 or similar device is used to read the diagnosis data stored in the memory 18 of the control unit 14. Typically, an operator (e.g., an automotive technician) uses the scan tool 24 to connect to the control unit 14 and prompt the same to report the diagnostic data. In the United States for example, new vehicles for sale are required to support OBD-II diagnostics using a standardized data link connector typically provided inside the vehicle 12. As is known in the art, the scan tool 24 may be connected to the connector in a wired or wireless manner. Once connected, the operator of the scan tool 24 enters a parameter ID (PID) that corresponds to a code used to request specific diagnostic data from the vehicle 12. With respect to OBD-II diagnostics, the available PIDs are typically defined by the SAE standard and some manufacturers may define additional PIDs that are specific to their vehicles. Each PID is generally sent over a vehicle network 26 (e.g., a CAN bus) and elicits a response from whichever control unit (e.g., controller 14) is responsible for the PID. In turn, the control unit responsible for the PID reports diagnostic data associated with the PID over the vehicle network 26. Next, the scan tool 24 reads the diagnostic data and displays the diagnostic data to the operator. As described herein, the diagnostic data may include a collection of DTCs that allow the operator to easily identify an operational condition such as a malfunction and employ the appropriate corrective countermeasures. Additionally, the scan tool 24 may be used to pull up other information related to the diagnostic data such as, but not limited to, a pinpoint test procedure, a system diagram, and an electrical schematic. Such information may be retrieved, using the scan tool 24, from a server 27 or website typically provided by the OEM or a pay service site such as ALLDATA®. Alternatively, it is envisioned that the information may be stored in the scan tool 24 or in the memory 18 of the control unit 14 and provided to the scan tool 24 over the vehicle network via a wired or wireless connection.

When diagnosing an operational condition of the vehicle 12, an operator of the scan tool 24 may be required to raise and lower the vehicle 12 in order to collect DTCs, perform tests, and the like. This process is often time consuming and may require the operator to consult manuals or view small screens on which information is displayed. For example, diagnostic data displayed on the scan tool 24 can be difficult to read and may be obscured due to dirt or grease deposited thereon from normal handling.

Advantageously, the system 10 described herein leverages one or more light sources onboard the vehicle 12 to project a diagnostic image onto a viewing surface. In the depicted embodiment, the light source includes a puddle light 28 operably coupled to a programmable controller 30 and configured to downwardly project the diagnostic image onto a ground surface such as a garage floor. However, it should be appreciated that other light sources of the vehicle 12 may be used to accomplish the same. In some embodiments, it is contemplated that the vehicle 12 may be equipped with a dedicated light source solely tasked to project the diagnostic image. In operation, the operator may use the scan tool 24 to instruct the controller 30 via a wired or wireless connection to activate the puddle light 28 in order to project a desired diagnostic image onto the viewing surface while the vehicle 12 is in a raised or lowered position. Thus, it should be appreciated that the puddle light 28 may be variously configured so as to be capable of projecting the diagnostic image as a cluster of light-emitting diodes (LEDs) of several colors along with optical elements, if needed, for projecting the diagnostic image at different distances and directions. The controller 30 may include a memory 31 having instructions 32 stored thereon that are executable by a processor 33. The instructions 32 may relate to interfacing with the scan tool 24 and operating the puddle light 28 in a manner so as to project the diagnostic image. The diagnostic image may be stored in the server 27, the scan tool 24, or the memory 31 of the controller 30.

The diagnostic image may correspond to one or more DTCs, a pinpoint test procedure, a system diagram, an electrical schematic, or other information useful in assessing and/or remedying an operational condition such as a malfunction of the vehicle 12. Typically, the projected diagnostic image will be larger and easier to view compared to the same being displayed on the scan tool 24. Furthermore, the diagnostic image may be displayed in a variety of colors to stand out against the viewing surface as well as highlight certain features. Thus, by relying on the projected diagnostic image, an automotive technician will have both hands free to service the vehicle 12 and will not need to interrupt his or her work in order to view the scan tool 24, a manual, or other source of information, thereby lessening the service time.

In some embodiments, the controller 30 may communicate with a vehicle audio system 56 (e.g., SYNC®) to provide audible information to the operator. Such audible information may include instructions, alerts, or prompts related to the projected diagnostic image or other servicing of the vehicle 12. It is also contemplated that the controller 30 may interface with the server 27 and/or the Internet 58 to retrieve information relating to the servicing of the vehicle 12. Such information may be similarly projected using the puddle light 28. In some embodiments, the server 27 may provide the diagnostic image that is to be projected to the controller 30 based on the diagnostic data read using the scan tool 24.

Figure 2:
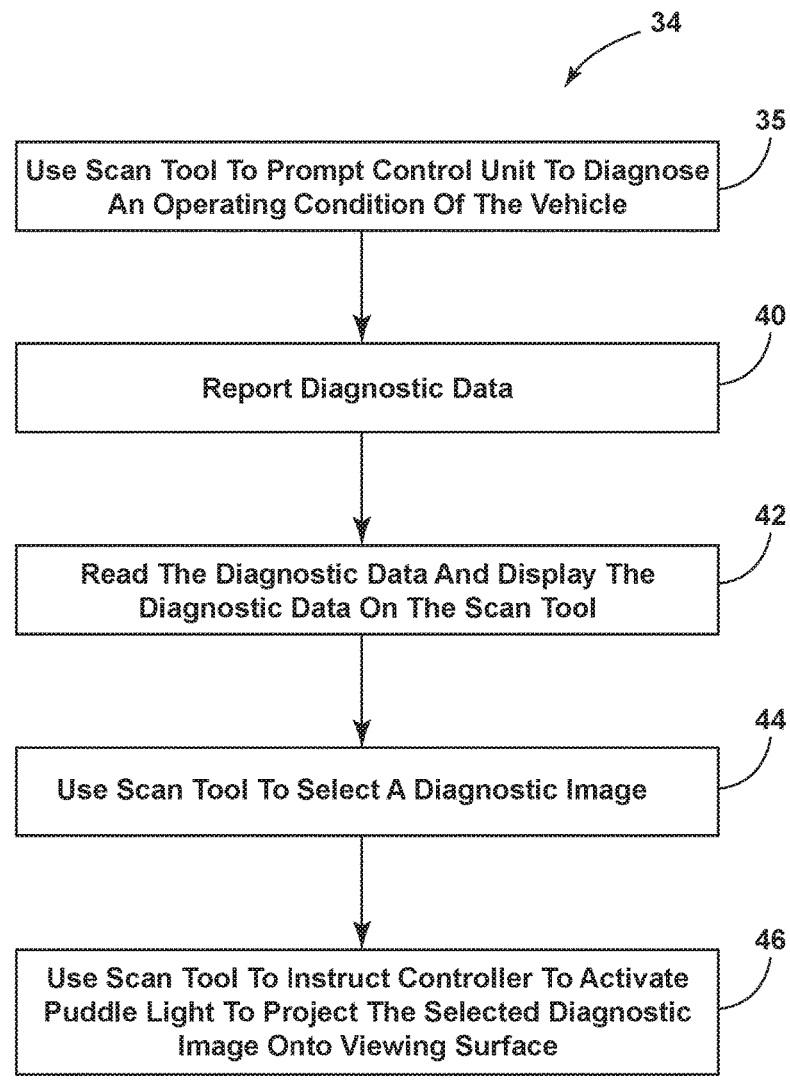
FIG. 2 is a flow diagram of a method of diagnosing an operating condition of the vehicle.

Referring to FIG. 2, a method 34 of diagnosing an operational condition of the vehicle 12 is shown according to one embodiment. The method 34 may be implemented using the system 10 described in reference to FIG. 1 and will be additionally described with reference to FIGS. 3 and 4, which illustrate an exemplary diagnostic scenario.

Figure 3:
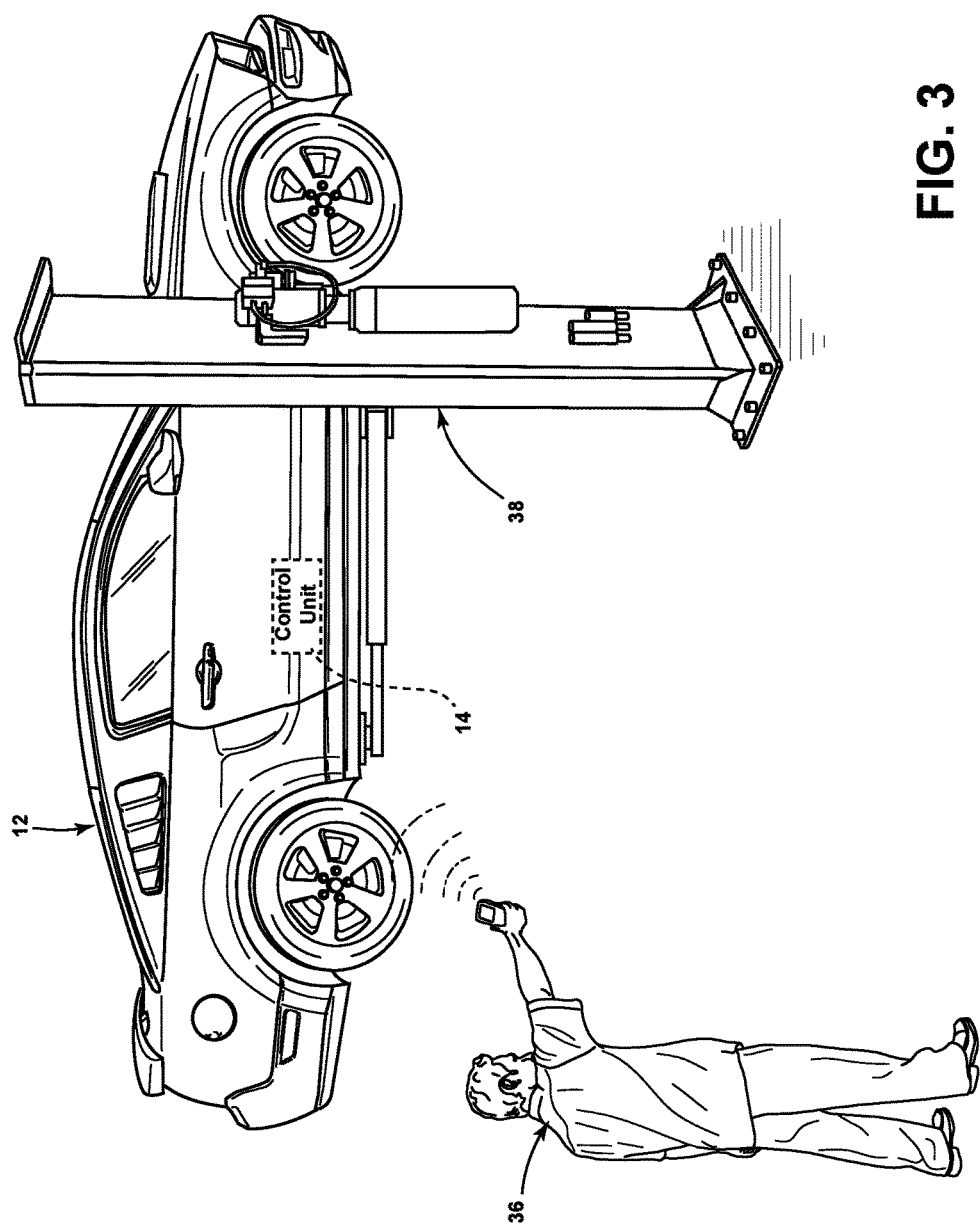
FIGS. 3 and 4 illustrate a diagnostic scenario.

The method 34 may begin at step 35 where an automotive technician 36 uses the scan tool 24 to prompt the control unit 14 to diagnose an operating condition of the vehicle 12, as shown in FIG. 3. In the depicted embodiment of FIG. 3, the vehicle 12 is raised on a lift 38 so that the automotive technician 36 can access the undercarriage of the vehicle 12 and service parts associated with the control unit 14, which may correspond to a brake control module, for example. The scan tool 24 wirelessly transmits the PID over the vehicle network 26 so that it can be received by the control unit 14. At step 40, the control unit 14 reports diagnostic data associated with the PID and the diagnostic data is read by the scan tool 24 and displayed thereon to the automotive technician 36 in step 42. At step 44, the automotive technician 36 uses the scan tool 24 to select a diagnostic image. As described herein, the diagnostic image may correspond to one or more DTCs, a pinpoint test procedure, a system diagram, an electrical schematic, or other information useful in assessing and/or remedying an operational condition of the vehicle 12. At step 46, the automotive technician 36 uses the scan tool 24 to instruct the controller 30 to activate the puddle light 28 to project the selected diagnostic image onto the viewing surface. Alternatively, the corresponding diagnostic image may be provided directly to the controller 30 from the server 27.

Figure 4:
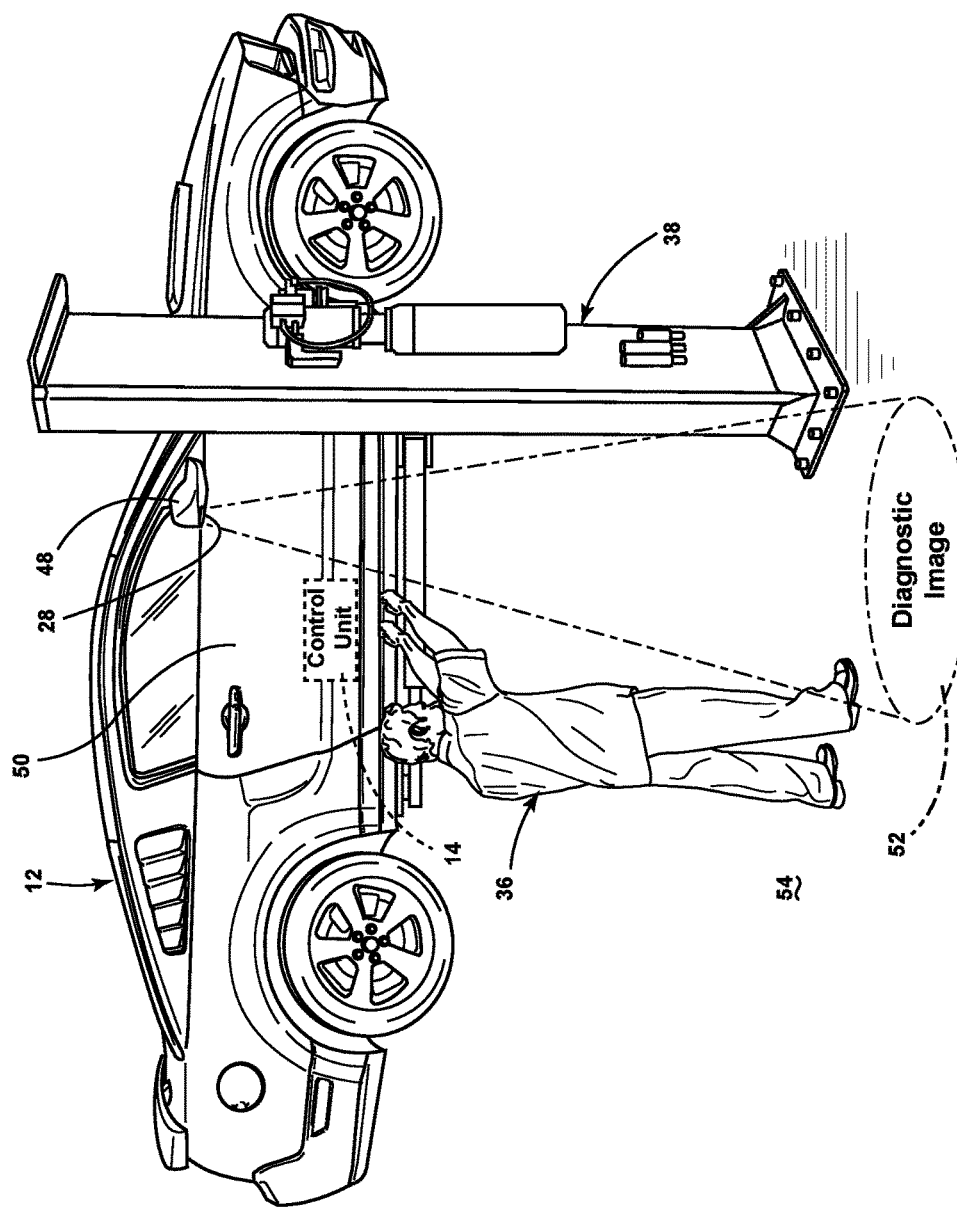

As exemplarily shown in FIG. 4, the puddle light 28 is operably coupled to the underside of a side mirror assembly 48 of the vehicle 12 but may be elsewhere located in other embodiments such as on the underside of a door 50, for example. As shown in FIG. 4, a diagnostic image 52 selected using the scan tool 24 is projected downwardly from the puddle light 28 onto a garage floor 54, which serves as the viewing surface. It should be appreciated that the size and directionality of the projected diagnostic image 52 may be variable based on the construction of the puddle light 28. In any event, by relying on the projected diagnostic image 52, the automotive technician 36 is now free to work on the vehicle 12 without needing to have the scan tool 24 nearby and the automotive technician 36 can quickly reference the projected diagnostic image 52 and continue to work without having to step away from the work zone. Should the automotive technician 36 require a different diagnostic image, steps 44 and 46 may be repeated. However, it is to be understood that additional light sources of the vehicle 12 may be used to project other diagnostic images. For example, the puddle light on the other side of the vehicle 12 may project a different diagnostic image onto the garage floor 54. Thus, by leveraging other light sources of the vehicle 12 to also project diagnostic images, the automotive technician 36 can remain in the work zone longer without having to use the scan tool 24 or other sources of information, thereby increasing efficiency and decreasing service time.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A diagnostic system of a vehicle, comprising:
    a control unit onboard the vehicle for controlling at least one of a vehicle system and a vehicle subsystem and configured for self-diagnosis;
    a device for prompting the control unit to report diagnostic data;
    a light source onboard the vehicle and operable to project a diagnostic image onto a viewing surface; and
    a controller in communication with the device and operably coupled to the light source, wherein the diagnostic image is stored on a server and the controller is configured to retrieve the diagnostic image from the server and operate the light source to project the diagnostic image.

2. The diagnostic system of claim 1, wherein the device comprises a scan tool in communication with the control unit.

3. The diagnostic system of claim 1, wherein the light source comprises a puddle light.

4. The diagnostic system of claim 1, wherein the viewing surface comprises a ground surface.

5. The diagnostic system of claim 1, wherein the diagnostic image is selected using the device.

6. The diagnostic system of claim 1, wherein the diagnostic image is one of a diagnostic trouble code, a pinpoint test procedure, and a system diagram.

7. A diagnostic system of a vehicle, comprising:
    a control unit onboard the vehicle for controlling at least one of a vehicle system and a vehicle subsystem;
    a device for prompting the control unit to diagnose an operating condition of the vehicle and report diagnostic data to the device;
    a light source onboard the vehicle and operable to project a diagnostic image onto a viewing surface located external to the vehicle;
    a controller separate from and in communication with the device and configured to operate the light source based on instructions received from the device; and
    a vehicle audio system in communication with the controller and configured to provide audible information related to the diagnostic image.

8. The diagnostic system of claim 7, wherein the device comprises a scan tool in communication with the control unit.

9. The diagnostic system of claim 7, wherein the light source comprises a puddle light.

10. The diagnostic system of claim 7, wherein the viewing surface comprises a ground surface.

11. The diagnostic system of claim 7, wherein the diagnostic image is selected using the device.

12. The diagnostic system of claim 7, wherein the diagnostic image is one of a diagnostic trouble code, a pinpoint test procedure, and a system diagram.

13. A method of diagnosing an operation condition of a vehicle, comprising:
    using a scan tool to prompt a control unit onboard the vehicle to diagnose the operating condition of the vehicle and report diagnostic data to the scan tool;
    sending instructions from the scan tool to a controller separate from the scan tool and configured to operate a light source onboard the vehicle to project a diagnostic image onto a viewing surface; and
    providing audible information related to the diagnostic image from a vehicle audio system.

14. The method of claim 13, wherein the light source comprises a puddle light.

15. The method of claim 13, wherein the viewing surface comprises a ground surface.

16. The method of claim 13, wherein the diagnostic image is selected using the scan tool.

17. The method of claim 13, wherein the diagnostic image is one of a diagnostic trouble code, a pinpoint test procedure, and a system diagram.

18. The diagnostic system of claim 7, wherein the diagnostic image is stored on a server and the controller is further configured to retrieve the diagnostic image from the server and operate the light source to project the diagnostic image.

* * * * *